(12) United States Patent
Achten et al.

(10) Patent No.: US 12,247,144 B2
(45) Date of Patent: Mar. 11, 2025

(54) ANHYDROUSLY CURING POLYISOCYANATE-BASED ADHESIVES

(71) Applicant: Covestro Intellectual Property GmbH & Co. KG, Leverkusen (DE)

(72) Inventors: Dirk Achten, Leverkusen (DE); Florian Golling, Düsseldorf (DE); Christoph Thiebes, Cologne (DE); Ute Nattke, Leverkusen (DE); Piet Driest, Amersfoort (NL)

(73) Assignee: Covestro Deutschland AG, Leverkusen (DE)

( * ) Notice: Subject to any disclaimer, the term of this patent is extended or adjusted under 35 U.S.C. 154(b) by 914 days.

(21) Appl. No.: 17/284,813

(22) PCT Filed: Oct. 17, 2019

(86) PCT No.: PCT/EP2019/078234
§ 371 (c)(1),
(2) Date: Apr. 13, 2021

(87) PCT Pub. No.: WO2020/079160
PCT Pub. Date: Apr. 23, 2020

(65) Prior Publication Data
US 2022/0145149 A1    May 12, 2022

(30) Foreign Application Priority Data

Oct. 19, 2018 (EP) .................................. 18201522

(51) Int. Cl.
| | | |
|---|---|---|
| *C09J 175/12* | (2006.01) |
| *B32B 37/12* | (2006.01) |
| *C08G 18/09* | (2006.01) |
| *C08G 18/10* | (2006.01) |
| *C08G 18/16* | (2006.01) |
| *C08G 18/20* | (2006.01) |
| *C08G 18/22* | (2006.01) |
| *C08G 18/24* | (2006.01) |
| *C08G 18/32* | (2006.01) |
| *C08G 18/48* | (2006.01) |
| *C08G 18/66* | (2006.01) |
| *C08G 18/72* | (2006.01) |
| *C08G 18/76* | (2006.01) |
| *C08G 18/78* | (2006.01) |
| *C09J 5/06* | (2006.01) |

(52) U.S. Cl.
CPC ......... *C09J 175/12* (2013.01); *B32B 37/1207* (2013.01); *C08G 18/092* (2013.01); *C08G 18/10* (2013.01); *C08G 18/168* (2013.01); *C08G 18/2018* (2013.01); *C08G 18/225* (2013.01); *C08G 18/242* (2013.01); *C08G 18/3206* (2013.01); *C08G 18/4845* (2013.01); *C08G 18/6607* (2013.01); *C08G 18/725* (2013.01); *C08G 18/7607* (2013.01); *C08G 18/7621* (2013.01); *C08G 18/7671* (2013.01); *C08G 18/7837* (2013.01); *C09J 5/06* (2013.01); *B32B 2311/24* (2013.01); *B32B 2317/16* (2013.01); *B32B 2323/10* (2013.01); *B32B 2325/00* (2013.01); *B32B 2327/06* (2013.01); *C09J 2475/00* (2013.01)

(58) Field of Classification Search
CPC ............ B32B 2311/24; B32B 2317/16; B32B 2323/10; B32B 2325/00; B32B 2327/06; B32B 37/1207; C08G 18/022; C08G 18/092; C08G 18/10; C08G 18/168; C08G 18/2018; C08G 18/225; C08G 18/242; C08G 18/3206; C08G 18/4845; C08G 18/6607; C08G 18/725; C08G 18/7607; C08G 18/7621; C08G 18/7671; C08G 18/7837; C08G 18/792; C08G 18/8016; C09J 175/04; C09J 175/12; C09J 2475/00; C09J 5/06
See application file for complete search history.

(56) References Cited

U.S. PATENT DOCUMENTS

| | | |
|---|---|---|
| 3,487,080 A | 12/1969 | Matsui et al. |
| 3,996,223 A | 12/1976 | Gupta et al. |
| 4,040,992 A | 8/1977 | Bechara et al. |
| 4,255,569 A | 3/1981 | Muller et al. |
| 4,265,798 A | 5/1981 | Mishra |
| 4,288,586 A | 9/1981 | Bock et al. |
| 4,324,879 A | 4/1982 | Bock et al. |
| 4,379,905 A | 4/1983 | Stemmler et al. |
| 4,419,513 A | 12/1983 | Breidenbach et al. |
| 4,499,253 A | 2/1985 | Kerimis et al. |
| 4,604,418 A | 8/1986 | Shindo et al. |
| 4,789,705 A | 12/1988 | Kase et al. |

(Continued)

FOREIGN PATENT DOCUMENTS

| | | |
|---|---|---|
| CA | 932333 A | 8/1973 |
| CN | 107652939 A | 2/2018 |

(Continued)

OTHER PUBLICATIONS

European Polymer Journal, vol. 16, 1979, pp. 147-148.
International Search Report for Application No. PCT/EP2019/078234, mailed Jan. 23, 2020.
J. Prakt. Chem. 336, 1994, pp. 185-200.
Justus Liebigs Annalen der Chemie, vol. 562, 1949, pp. 75-136.
Aggias, Z. et al, Adhasion Kleben und Dichten [Adhesion bonding and sealing], 40, 7, 1996 p. 26.

(Continued)

*Primary Examiner* — Philip C Tucker
*Assistant Examiner* — Jimmy R Smith, Jr.
(74) *Attorney, Agent, or Firm* — The Webb Law Firm

(57) ABSTRACT

The present invention relates to adhesives which are characterized in that they cure in the absence of water and at room temperature with the formation of isocyanurate groups.

13 Claims, No Drawings

(56) References Cited

U.S. PATENT DOCUMENTS

| | | | |
|---|---|---|---|
| 4,837,359 A | 6/1989 | Woynar et al. | |
| 4,960,848 A | 10/1990 | Scholl et al. | |
| 4,994,541 A | 2/1991 | Dell et al. | |
| 5,013,838 A | 5/1991 | Scholl | |
| 5,064,960 A | 11/1991 | Pedain et al. | |
| 5,076,958 A | 12/1991 | Pedain et al. | |
| 5,158,922 A | 10/1992 | Hinney et al. | |
| 5,470,813 A | 11/1995 | Le-Khac | |
| 5,489,663 A | 2/1996 | Brandt et al. | |
| 5,556,934 A | 9/1996 | Hagquist et al. | |
| 5,914,383 A | 6/1999 | Richter et al. | |
| 6,090,939 A | 7/2000 | Richter et al. | |
| 6,635,761 B1 | 10/2003 | Revelant et al. | |
| 7,056,415 B2 | 6/2006 | Meckel | |
| 2002/0091222 A1 | 7/2002 | Viegas et al. | |
| 2002/0120089 A1 | 8/2002 | Kohlstruk et al. | |
| 2003/0212227 A1 | 11/2003 | Stroobants et al. | |
| 2006/0155095 A1 | 7/2006 | Daussin et al. | |
| 2007/0078234 A1 | 4/2007 | Mager et al. | |
| 2007/0197759 A1 | 8/2007 | Binder et al. | |
| 2010/0136346 A1* | 6/2010 | Gurke | C08G 18/12 428/423.1 |
| 2013/0059973 A1 | 3/2013 | Wamprecht et al. | |
| 2013/0303758 A1 | 11/2013 | Lucas et al. | |
| 2015/0158966 A1 | 6/2015 | Laas et al. | |
| 2017/0008995 A1 | 1/2017 | Richter | |
| 2017/0335046 A1* | 11/2017 | Delajon | C08G 18/4018 |
| 2018/0244826 A1 | 8/2018 | Richter | |
| 2019/0144593 A1 | 5/2019 | Hocke et al. | |
| 2020/0216722 A1* | 7/2020 | Wilfried | E04D 1/34 |
| 2020/0339501 A1 | 10/2020 | Ladnak et al. | |

FOREIGN PATENT DOCUMENTS

| | | |
|---|---|---|
| DE | 2414413 A | 10/1975 |
| DE | 3240613 A | 5/1984 |
| EP | 0013880 A1 | 8/1980 |
| EP | 0100129 A1 | 2/1984 |
| EP | 0443167 A1 | 8/1991 |
| EP | 0671426 A1 | 9/1995 |
| EP | 0896009 A1 | 2/1999 |
| GB | 809809 A | 3/1959 |
| GB | 1244416 A | 9/1971 |
| GB | 1386399 A | 3/1975 |
| GB | 1391066 A | 4/1975 |
| GB | 2221465 A | 2/1990 |
| GB | 2222161 A | 2/1990 |

OTHER PUBLICATIONS

Meier-Westhues, Polyurethane Lacquers, Adhesives and Sealants, Vincenz Network, Hanover, 2007, pp. 144-145.

Saunders et al., Polyurethanes Chemistry and Technology, 1962, p. 94 ff.

* cited by examiner

ANHYDROUSLY CURING POLYISOCYANATE-BASED ADHESIVES

CROSS-REFERENCE TO RELATED APPLICATION

This application is a national stage application under 35 U.S.C. § 371 of PCT/EP2019/078234, filed Oct. 17, 2019, which claims the benefit of European Application No. 18201522.2, filed Oct. 19, 2018, each of which is incorporated herein by reference.

FIELD

The present invention relates to adhesives and coatings having a high ratio of isocyanate groups to isocyanate-reactive groups and use thereof. These adhesives are characterized in that they cure in the absence of water and at room temperature with the formation of isocyanurate groups.

BACKGROUND

In the prior art, adhesives based on polyisocyanates are known which cure at room temperature (Leimenstoll, Stepanski, Polyurethanklebstoffe [Polyurethane adhesives], Springer Fachmedien, Wiesbaden, 2016; EP 1 343 832 B1; EP 2 566 906 A1). This curing is mediated by the formation of polyureas. This process requires water, which reacts with isocyanate groups releasing carbon dioxide to form amines, which subsequently react with isocyanate groups to form urea groups.

Therefore, such adhesive compositions are not suitable for applications in which dry substrates are bonded to one another without moist room air having access to the adhesive joint. Furthermore, the formation of carbon dioxide during the formation is disadvantageous because this creates bubbles in the adhesive joint, which weaken the stability of the bond. This problem becomes ever more serious with increasing thickness of the adhesive joint, since larger amounts of adhesive also produce correspondingly more carbon dioxide. With the use of oxazolidines as chemically blocked chain extenders, the formation of carbon dioxide can be reduced, but considerable odor pollution and VOC emissions by the volatile blocking agent released from the oxazolidine has to be accepted.

Two-component systems composed of polyols and isocyanates as adhesives are also known(Leimenstoll, Stepanski, Polyurethanklebstoffe [Polyurethane adhesives], Springer Fachmedien Wiesbaden 2016; EP 1 343 832; CN107652939; Z. Zaggias, R. Karrer, L. Thiele, Adhäsion Kleben and Dichten [Adhesion bonding and sealing], 40, 7, 1996 page 26). The mechanical properties of these adhesives depend very much on the correct mixing ratio of the two components, since this directly influences the degree of crosslinking of the polymer.

For the adhesives mentioned above, compounds comprising transition metals, in particular tin, are often used as catalysts, since they can be metered in particularly well and exhibit high reactivity. The fact that these transition metal compounds remain in the bond tends however to be undesirable since these also catalyze the reverse reaction, i.e. cleavage of the urethane bond, and the use of transition metal compounds may make it necessary in certain circumstances to label the adhesive formulation accordingly.

U.S. Pat. No. 5,556,934 describes polymerizable compositions which are used to bond the bristles of a brush. The molar ratio of isocyanate groups to isocyanate-reactive groups must not be higher than 4:1 to prevent foam formation.

US 2002/0091222 describes polymerizable compositions for bonding rubber, which cure at room temperature. The primary crosslinking mechanism is the formation of polyureas. Crosslinking of isocyanate groups with one another through formation of isocyanurate groups is only intended to reduce excess isocyanate groups. That is why the molar ratio of isocyanate groups to isocyanate-reactive groups is at most 2.2:1.0.

SUMMARY

The object of the present invention was to provide a coating composition which cures at room temperature without addition of water or atmospheric moisture and, under these conditions, is particularly suitable for producing thick adhesive joints.

In a first embodiment, the present invention relates to a coating composition comprising
  a) a polyisocyanate composition A having an average isocyanate functionality of at least 1.5; and
  b) at least one catalyst B, which at 23° C. catalyzes the reaction of NCO groups to isocyanurate groups and/or uretdione groups;
wherein the isocyanate content of the coating composition, based on the total weight of the coating composition, is at least 5% by weight.

In a preferred embodiment, the coating composition according to the invention comprises at least one compound C comprising on average at least 1.0 group reactive with isocyanate group per molecule.

In a further embodiment, the coating composition according to the invention comprises fillers D.

In yet another embodiment, the coating composition according to the invention comprises additives E.

A "coating composition" is a mixture of the aforementioned components which is suitable for coating a surface with a curing film. The coating composition is particularly preferably used as an adhesive for the integral bonding of two workpieces. Here, the coating composition is applied to at least one of the two surfaces before the two surfaces are brought into contact with each another. The coating composition can optionally comprise additional components as defined further below in this application.

The coating composition according to the invention has an isocyanate group content of 5.0 to 60.0% by weight, preferably from 7.0 to 45.0% by weight, more preferably from 10.0 to 30.0% by weight and most preferably from 12.0 to 25% by weight.

In a preferred embodiment of the present invention, the organic phase of the coating composition according to the invention has an isocyanate group content of 5.0 to 60.0% by weight, preferably 7.0 to 45.0% by weight, more preferably 10.0 to 30.0% by weight and most preferably from 12.0 to 25% by weight. "Organic phase" is understood here to mean the entirety of all constituents of the coating composition which are homogeneously miscible with the polyisocyanate composition A.

In a preferred embodiment of the present invention, the coating composition comprises less than 0.1% by weight, preferably less than 0.05% by weight, particularly preferably less than 0.01% by weight and very particularly preferably less than 0.005% by weight transition metals. "Transition metal" in the context of the present application are tin, zinc, zirconium, titanium, iron, cobalt, nickel, scandium, ytrium, niobium, molybdenum. In a particularly preferred embodiment of the present invention, the coating composition according to the invention is free from tin, zinc, zirconium and titanium.

The coating composition according to the invention is preferably characterized by a water content of at most 1.5% by weight, more preferably at most 0.5% by weight, even more preferably at most 0.3% by weight and especially preferably at most 0.1% by weight (determined according to DIN EN ISO 15512: 2017-03, method B2).

In a preferred embodiment of the present invention, the molar ratio of isocyanate groups to isocyanate-reactive groups in the coating composition according to the invention is at least 2:1 and more preferably at least 3:1 and even more preferably at least 5:1. In the context of the present patent application, "isocyanate-reactive groups" are hydroxyl, amino and thiol groups.

DETAILED DESCRIPTION

Polyisocyanate Composition A

The term "polyisocyanate composition A" refers to the entirety of all compounds present in the coating composition having at least one isocyanate group. The polyisocyanate composition A preferably comprises at least one compound selected from the group consisting of monomeric polyisocyanates, oligomeric polyisocyanates and isocyanate-terminated prepolymers.

The term "polyisocyanate" as used here is a collective term for compounds comprising two or more isocyanate groups (this is understood by the person skilled in the art to mean free isocyanate groups of the general structure —N═C═O) in the molecule. The simplest and most important representatives of these polyisocyanates are the diisocyanates. These have the general structure O═C═N—R—N═C═O, where R typically represents aliphatic, cycloaliphatic and/or aromatic radicals.

The entirety of all molecules present in the polyisocyanate composition A having at least one isocyanate group preferably has an average NCO functionality per molecule of 1.5 to 6.5, more preferably 1.8 to 5.0 and particularly preferably 2.0 to 4.5.

In principle, polyisocyanates having aliphatically, cycloaliphatically, araliphatically and aromatically bonded isocyanate groups are equally suitable as constituents of the polyisocyanate composition A.

For reasons of availability and cost, they are particularly preferably polyisocyanates having aliphatically and aromatically bonded isocyanate groups. Particularly preferred are polyisocyanates or polyisocyanate mixtures based on HDI, PDI, BDI, TDI, MDI and multinuclear MDI homologues (PMDI).

Because of the polyfunctionality (≥2 isocyanate groups), it is possible to use polyisocyanates to produce a multitude of polymers (e.g. polyurethanes, polyureas and polyisocyanurates) and low molecular weight compounds (e.g. those having uretdione, isocyanurate, allophanate, biuret, iminooxadiazinedione and/or oxadiazinetrione structure).

In the present application the term "polyisocyanates" refers to both monomeric and oligomeric polyisocyanates. For the understanding of many aspects of the invention, however, it is important to distinguish between monomeric polyisocyanates and oligomeric polyisocyanates. Where reference is made in this application to "oligomeric polyisocyanates", this means polyisocyanates formed from at least two monomeric polyisocyanate molecules, i.e. compounds that constitute or comprise a reaction product formed from at least two monomeric polyisocyanate molecules. Said monomeric polyisocyanates are preferably diisocyanates, i.e. monomeric isocyanates having two isocyanate groups per molecule. In contrast to the isocyanate-terminated prepolymers defined further below in this application, oligomeric polyisocyanates are characterized by a molecular weight of at most 900 g/mol, preferably at most 800 g/mol and particularly preferably at most 700 g/mol.

The production of oligomeric polyisocyanates from monomeric diisocyanates is here also referred to as modification of monomeric diisocyanates. This "modification" as used here means the reaction of monomeric diisocyanates to give oligomeric polyisocyanates having urethane, uretdione, isocyanurate, allophanate, biuret, iminooxadiazinedione and/or oxadiazinetrione structures.

For example, hexamethylene diisocyanate (HDI) is a "monomeric diisocyanate" since it comprises two isocyanate groups and is not a reaction product of at least two polyisocyanate molecules:

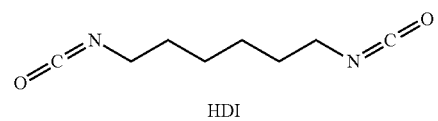

HDI

By contrast, reaction products of at least two HDI molecules which still have at least two isocyanate groups are "oligomeric polyisocyanates" in the context of the invention. Proceeding from monomeric HDI, representatives of such "oligomeric polyisocyanates" include for example the HDI isocyanurate and the HDI biuret each constructed from three monomeric HDI units:

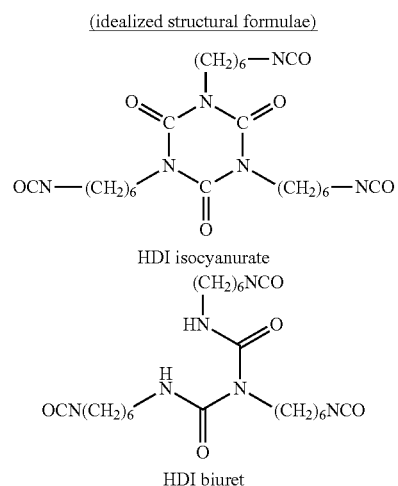

According to the invention, the proportion by weight of isocyanate groups based on the total amount of the isocyanate component A is at least 5.0% by weight.

In principle, monomeric and oligomeric polyisocyanates are equally suitable for use in the isocyanate component A according to the invention. Consequently, the isocyanate component A may consist essentially of monomeric polyisocyanates or essentially of oligomeric polyisocyanates. It may alternatively comprise oligomeric and monomeric polyisocyanates in any desired mixing ratios. Monomeric and oligomeric polyisocyanates can be present in polyisocyanate composition A in any desired mixing ratio with one or more isocyanate-terminated prepolymers.

In a preferred embodiment of the invention, the polyisocyanate composition A used as reactant in the trimerization has a low level of monomers (i.e. a low level of monomeric polyisocyanates) and already comprises oligomeric polyisocyanates. The terms "low in monomers" and "low in monomeric polyisocyanates" are here used synonymously in relation to the polyisocyanate composition A.

A "low-monomer" polyisocyanate composition A has a proportion of monomeric diisocyanates of at most 20% by weight, preferably at most 15% by weight, more preferably at most 10% by weight, even more preferably at most 5% by weight and particularly preferably at most 2% by weight, based in each case on the weight of the isocyanate component A. In a particularly preferred embodiment of the present invention, the polyisocyanate composition A is essentially free from monomeric polyisocyanates. In this embodiment, the proportion of monomeric polyisocyanates in the total weight of the polyisocyanate composition A is preferably at most 1.0% by weight, particularly preferably at most 0.5% by weight and very particularly preferably below 0.1% by weight.

Polyisocyanate compositions which have a low level of monomers or are essentially free of monomeric isocyanates can be obtained by conducting, after the actual modification reaction, in each case, at least one further process step for removal of the unconverted excess monomeric diisocyanates. This removal of monomers can be effected in a particularly practical manner by processes known per se, preferably by thin-film distillation under high vacuum or by extraction with suitable solvents that are inert toward isocyanate groups, for example aliphatic or cycloaliphatic hydrocarbons such as pentane, hexane, heptane, cyclopentane or cyclohexane. Further possibilities for reducing the monomer content include a reaction with compounds comprising isocyanate-reactive groups which react selectively (preferably) with isocyanate monomers, as described, for example, in EP1201695A1.

According to a further particular embodiment of the present invention, the polyisocyanate composition A) comprises monomeric monoisocyanates or monomeric isocyanates having an isocyanate functionality greater than two, i.e. having more than two isocyanate groups per molecule. The addition of monomeric monoisocyanates or monomeric isocyanates having an isocyanate functionality greater than two has been found to be advantageous in order to influence the network density of the adhesives. Particularly practical results are obtained when isocyanate component A has a proportion of monomeric monoisocyanates or monomeric isocyanates having an isocyanate functionality greater than two in the isocyanate component A of at least 2% by weight and at most 20% by weight, preferably at most 10% by weight and more preferably at most 5% by weight, based in each case on the weight of the isocyanate component A. Particularly preferred monomeric isocyanates in this context are trisocyanatononane and stearyl isocyanate.

According to the invention, the oligomeric polyisocyanates may in particular have uretdione, isocyanurate, allophanate, biuret, iminooxadiazinedione and/or oxadiazinetrione structure. In one embodiment of the invention, the oligomeric polyisocyanates have at least one of the following oligomeric structure types or mixtures thereof:

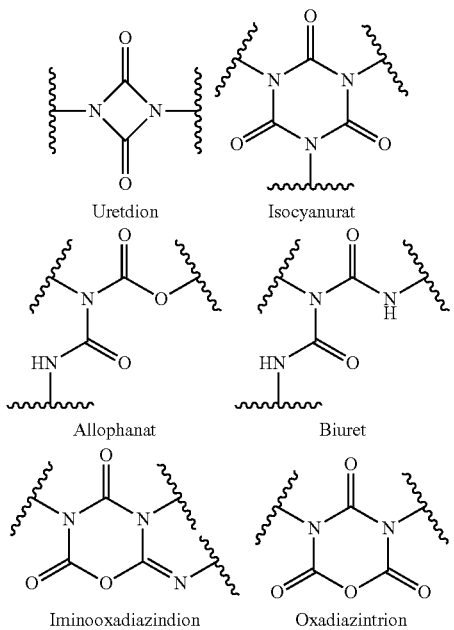

According to a preferred embodiment of the invention, the polyisocyanate composition A consists to an extent of at least 80% by weight of an oligomeric polyisocyanate, of which the isocyanurate structural content is at least 50 mol %, preferably at least 60 mol %, more preferably at least 70 mol %, even more preferably at least 80 mol %, even more preferably at least 90 mol % and particularly preferably at least 95 mol %, based on the sum total of the oligomeric structures present in said oligomeric polyisocyanate from the group consisting of uretdione, isocyanurate, allophanate, biuret, iminooxadiazinedione and oxadiazinetrione structure.

According to a further preferred embodiment of the invention, the polyisocyanate composition A comprises an oligomeric polyisocyanate which, in addition to the isocyanurate structure, comprises at least one further oligomeric polyisocyanate having a uretdione, biuret, allophanate, iminooxadiazinedione and oxadiazinetrione structure and mixtures thereof.

The proportions of uretdione, isocyanurate, allophanate, biuret, iminooxadiazinedione and/or oxadiazinetrione structure in a polyisocyanate can be determined, for example, by NMR spectroscopy. It is possible here with preference to use $^{13}$C NMR spectroscopy, preferably proton-decoupled, since the oligomeric structures mentioned give characteristic signals.

Irrespective of the underlying oligomeric structure (uretdione, isocyanurate, allophanate, biuret, iminooxadiazinedione and/or oxadiazinetrione structure), an oligomeric polyisocyanate composition A for use in the process according to the invention preferably has a (mean) NCO functionality of 1.5 to 5.0, preferably of 2.3 to 4.5.

Particularly practical results are obtained when the polyisocyanate component A to be used according to the invention has a content of isocyanate groups of 9.0% to 60.0% by weight, preferably of 12.0% to 30.0% by weight, based in each case on the weight of the isocyanate component A.

Production processes for the oligomeric polyisocyanates having a uretdione, isocyanurate, allophanate, biuret, iminooxadiazinedione and/or oxadiazinetrione structure for use according to the invention are described, for example, in J. Prakt. Chem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299.

Suitable polyisocyanates for production of the polyisocyanate composition A for use in the process according to the invention and the monomeric and/or oligomeric polyisocyanates present therein are any desired polyisocyanates obtainable in various ways, for example by phosgenation in the liquid or gas phase or by a phosgene-free route, for example by thermal urethane cleavage. The monomeric polyisocyanates listed below are particularly suitable.

Said monomeric polyisocyanates as such—i.e. without prior conversion to oligomeric polyisocyanates—are also preferred constituents of the polyisocyanate composition A.

In the case of an isocyanate having aliphatically bonded isocyanate groups, all isocyanate groups are bonded to an $sp^3$-hybridized carbon atom. Preferred polyisocyanates having aliphatically bonded isocyanate groups are n-butyl isocyanate and all isomers thereof, n-pentyl isocyanate and all isomers thereof, n-hexyl isocyanate and all isomers thereof, 1,4-butyl diisocyanate, 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, and triisocyanatononane.

In an isocyanate having cycloaliphatically bonded isocyanate groups all isocyanate groups are bonded to carbon atoms which are part of a closed ring of carbon atoms. This ring may be unsaturated at one or more sites provided that it does not attain aromatic character as a result of the presence of double bonds. Preferred polyisocyanates having cycloaliphatically bonded isocyanate groups are cyclohexyl isocyanate, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane and 1,3-dimethyl-5,7-diisocyanatoadamantane.

In an isocyanate having araliphatically bonded isocyanate groups, all isocyanate groups are bonded to alkylene radicals which are in turn bonded to an aromatic ring. Preferred polyisocyanates having araliphatically bonded isocyanate groups are 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate.

In an isocyanate having aromatically bonded isocyanate groups all isocyanate groups are bonded directly to carbon atoms which are part of an aromatic ring. Preferred isocyanates having aromatically bonded isocyanate groups are 2,4- and 2,6-diisocyanatotoluene (TDI), 2,4'- and 4,4'-diisocyanatodiphenylmethane (MDI), 1,5-diisocyanatonaphthalene, tris (p-isocyanatophenyl) thiophosphate and triphenylmethane-4,4',4''-triisocyanate.

In a further embodiment, the polyisocyanate composition A comprises compounds which, in addition to the isocyanate group, comprise other non-isocyanate-reactive groups. For example, these are silane groups, the compounds then being isocyanatosilanes. "Silane group" in this case refers to an organosilicon group having at least one organic radical bonded via an Si—O bond, for example an alkoxy or acyloxy group. Such silane groups are also known to those skilled in the art as organoalkoxysilane or organoacyloxysilane. Silanes have the property of hydrolyzing on contact with moisture to afford organosilanols, that is to say of forming groups having at least one silanol group (Si—OH group), and of polymerizing as a result of subsequent condensation to afford organosiloxanes. Silane or silanol groups can also react with polar groups on the substrate surface to form covalent bonds, which can improve the adhesion of adhesives to substrates. The isocyanatosilanes according to the invention are preferably isocyanatomethylsilanes or isocyanatopropylsilanes, which are the best commercially available, and are reaction products, containing silane and isocyanate groups, of hydroxy- and/or amino- and/or thiosilanes with polyisocyanates, not all isocyanate groups having reacted because, for example, the hydroxyl and/or amino and/or thio groups are reacted with the isocyanate groups in a stoichiometric deficit. The isocyanatosilane is very particularly preferably selected from the group consisting of 3-isocyanatopropyltrimethoxysilane, 3-isocyanatopropyltriethoxysilane, 1-isocyanatomethyltrimethoxysilane, 1-isocyanatomethyltriethoxysilane, 1-isocyanatomethylmethyldimethoxysilane and 1-isocyanatomethylmethyldiethoxysilane. Here, all silanes can also be present in the form of their oligomers containing siloxane groups.

In a preferred embodiment of the present invention, the polyisocyanate composition A consists to an extent of at least 80% by weight, more preferably at least 90% by weight, even more preferably at least 95% by weight and most preferably at least 98% by weight of polyisocyanates having aliphatically bonded isocyanate groups.

Isocyanate-Terminated Prepolymers

Isocyanate-terminated prepolymers having a number average molecular weight of at least 400 g/mol, preferably at least 500 g/mol, more preferably at least 600 g/mol, and even more preferably at least 700 g/mol are included as a constituent of the polyisocyanate composition A. The molecular weight of suitable prepolymers in this case is preferably at most 22 000 g/mol, preferably at most 15 000 g/mol, more preferably at most 9000 g/mol and particularly preferably at most 5000 g/mol. Particularly preferred isocyanate-terminated prepolymers have a number average molecular weight between 500 g/mol and 5000 g/mol.

In addition to the isocyanate-terminated prepolymer, the polyisocyanate composition A may also comprise monomeric and/or oligomeric polyisocyanates. This is particularly preferred for those prepolymers where the isocyanate content is too low to achieve the required isocyanate content of the polyisocyanate composition A as defined above. If the isocyanate content of the prepolymer or a mixture of at least two prepolymers used is high enough, the polyisocyanate composition A may also consist exclusively of isocyanate-terminated prepolymers.

Isocyanate-terminated prepolymers are obtained by reacting monomeric or oligomeric polyisocyanates with compounds which on average comprise more than one isocyanate-reactive group per molecule, with a molar excess of isocyanate groups compared to the isocyanate-reactive groups being present in the reaction mixture. The compounds which comprise on average more than one isocyanate-reactive group per molecule are preferably polyols and/or polyamines, there being a molar excess of isocyanate groups over amino and hydroxyl groups in the reaction mixture. Corresponding production processes are well known to those skilled in the art.

Polyacrylates, polycarbonates, polyesters, polyurethanes or polyethers, which are functionalized with at least two NCO-reactive groups, preferably hydroxyl groups, can preferably be used as polyols for constructing the isocyanate-terminated prepolymers that can be used in accordance with the invention. Mixtures of at least two of the aforementioned components can also be used.

Polyethers are particularly preferred as polyols as they have a flexible and elastic structure which can be used to produce compositions having outstanding elastic properties. Polyethers are not only flexible in their base skeleton but also stable at the same time. For example, polyethers are not attacked or broken down by water or bacteria, in contrast to polyesters, for example. Polytetramethylene polyols, polyoxyethylene polyols and polyoxypropylene polyols are particularly suitable, especially polyoxyethylene diols, polyoxypropylene diols, polyoxyethylene triols and polyoxypropylene triols.

The polyols to be used according to the invention preferably have a number average molecular weight of 400 to 22 000 g/mol. In particular, the NCO-reactive polymers to be used according to the invention have a number-average molecular weight of 500 to 15 000 g/mol, preferably 600 to 9000 g/mol, particularly preferably 700 to 5000 g/mol. These molecular weights are particularly advantageous because the corresponding prepolymers have a balanced ratio of viscosity (easy processability), strength and elasticity.

Particularly advantageous viscoelastic properties can be achieved when NCO-reactive polymers having a narrow molar mass distribution and hence a low polydispersity are used. The polydispersity describes the ratio of weight-average to number-average molecular weight Mw/Mn. The NCO-reactive polymer preferably has a polydispersity of at most 5, preferably at most 2.5, particularly preferably at most 1.5.

In a further advantageous embodiment, NCO-reactive polymers having a bimodal or multimodal molar mass distribution are used. Bimodality is defined here as the product of a mixture of more than one NCO-reactive polymers having a polydispersity of at most 5, preferably at most 2.5, particularly preferably at most 1.5. In a particularly preferred embodiment, this mixing may also be effected during the preparation of the isocyanate composition according to the invention via the preparation of the isocyanate prepolymer using various polyols having different molecular weight distributions and compositions.

Unless otherwise indicated, the number- and/or weight-average molecular weight is determined by gel permeation chromatography (GPC) according to the method of DIN 55672-1:2016-03 using THF as eluent against a polystyrene standard.

Particular preference is given to polyether polyols preparable by what is known as double metal cyanide catalysis (DMC catalysis). This is described for example in U.S. Pat. No. 5,158,922 (e.g. Example 30) and EP 0 654 302 (p. 5, line 26 to p. 6, line 32). Polyether polyols prepared in this way feature a particularly low polydispersity, a high average molecular weight and a very low degree of unsaturation. Corresponding products are available, for example, from Covestro Deutschland AG under the name Acclaim®.

The polyols to be used according to the invention preferably have a mean OH functionality of 1.2 to 3, particularly preferably of 1.5 to 2.1. The OH functionality of a compound is understood as meaning the mean OH functionality. It indicates the mean number of hydroxyl groups per molecule. The mean OH functionality of a compound can be calculated on the basis of the number-average molecular weight and the hydroxyl number. Unless otherwise indicated, the hydroxyl number of a compound is determined according to the DIN 53240-1 (2012) standard.

Particularly suitable are polyoxyalkylene diols or polyoxyalkylene triols having a degree of unsaturation of less than 0.02 mEq/g (determined according to the method in ASTM D4671-16) and having a number-average molecular weight (determined by GPC) in the range from 2000 to 30 000 g/mol, and also polyoxyethylene diols, polyoxyethylene triols, polyoxypropylene diols and polyoxypropylene triols having an average molecular weight of 400 to 22 000 g/mol. Likewise particularly suitable are what are known as ethylene oxide-terminated ("EO endcapped", ethylene oxide endcapped) polyoxypropylene polyols. The latter are obtained when, during the preparation, propylene oxide is first used as monomer for the polymerization and then, prior to termination of the polymerization, ethylene oxide is used as monomer instead of propylene oxide.

Also suitable are hydroxyl group-terminated polybutadiene polyols, such as for example those prepared by polymerization of 1,3-butadiene and allyl alcohol or by oxidation of polybutadiene, and also hydrogenation products thereof.

Also suitable are styrene-acrylonitrile-grafted polyether polyols, as are commercially available for example from Elastogran GmbH, Germany, under the trade name Lupranol®.

Suitable polyester polyols are in particular polyesters bearing at least two hydroxyl groups and prepared by known methods, in particular by the polycondensation of hydroxycarboxylic acids or the polycondensation of aliphatic and/or aromatic polycarboxylic acids with dihydric or polyhydric alcohols.

Suitable polycarbonate polyols are in particular those as are obtainable by reaction, for example, of the abovementioned alcohols used for forming the polyester polyols with dialkyl carbonates such as dimethyl carbonate, diaryl carbonates such as diphenyl carbonate or phosgene. Polycarbonate diols are particularly suitable, especially amorphous polycarbonate diols. Further suitable polycarbonate polyols are those which, in addition to polycarbonate groups, also comprise polyether groups and are formed, for example, by the polymerization of propylene oxide and/or ethylene oxide and carbon dioxide in the presence of suitable catalysts.

Further suitable polyols are poly(meth)acrylate polyols.

Further suitable polyols are "polymer polyols", for example polyether polyols comprising polymers and/or copolymers of vinylic monomers such as, in particular, acrylonitrile, styrene, alpha-methylstyrene, methyl (meth)acrylate or hydroxyethyl (meth)acrylate, and polyureas or polyhydrazodicarbonamides (PHD) or polyurethanes, where the two phases form a stable, storable dispersion and the polymer can be partially grafted onto the polyether polyol or covalently bonded to the polyether polyol. Preference is given to polymer polyols in which the solid polymer is a copolymer of acrylonitrile and styrene (SAN) or is a polyurea or polyhydrazodicarbonamide (PHD) or a polyurethane. These polymer polyols are particularly easy to manufacture and store. Very particular preference is given to SAN. This is particularly hydrophobic and therefore advantageous in combination with isocyanates. The polyether polyol of the polymer polyol is preferably a polyoxyalkylene polyol, which is prepared by ring-opening polymerization of oxiranes, in particular ethylene oxide and/or 1,2-propylene oxide, with the aid of a starter molecule having two or more active hydrogen atoms, in particular water, glycols such as 1,2-ethanediol, 1,2- and 1,3-propanediol, neopentyl glycol, diethylene glycol, triethylene glycol, polyethylene glycols, dipropylene glycol, tripropylene glycol or polypropylene glycols, or triols, in particular glycerol or 1,1,1-trimethylolpropane, or sugar alcohols, especially sorbitol (D-glucitol), or diphenols, in particular bisphenol A, or amines, in particular ammonia, ethylenediamine or aniline, or a mixture thereof. Commercially available types, which are used primarily for producing flexible polyurethane foams, are preferred as polymer polyol, in particular the SAN polyols Lupranol® 4003/1, Lupranol® 4006/1/SC10, Lupranor® 4006/1/SC15, Lupranol® 4006/1/SC25, Lupranol® 4010/1/SC10, Lupranol® 4010/1/SC15, Lupranol® 4010/1/SC25, Lupranol® 4010/1/SC30 or Lupranol® 4010/1/SC40 (all from BASF), Desmophen® 5027 GT or Desmophen® 5029 GT (both from Covestro Deutschland AG), Voralux® HL106, Voralux® HL108, Voralux® HL109, Voralux® HL120, Voralux® HL400, Voralux® HN360, Voralux® HN370, Voralux® HN380 or Specflex® NC 700 (all from Dow), Carador® SP27-25, Caradol® SP30-15, Caradol® SP30-45, Caradol® SP37-25, Caradol® SP42-15, Caradol® SP44-10 or Caradol® MD22-40 (all from Shell), and the PHD polyol Desmophen® 5028 GT (from Covestro). Of these, the SAN polyols are particularly preferred, especially the commercially available types mentioned.

Also suitable are polyhydroxy-functional fats and oils, for example natural fats and oils, especially castor oil, or so-called oleochemical polyols obtained by chemical modification of natural fats and oils, the epoxy polyesters or epoxy polyethers obtained for example by epoxidation of unsaturated oils and subsequent ring opening with carboxylic acids or alcohols, or polyols obtained by hydroformylation and hydrogenation of unsaturated oils.

Also suitable are polyols which are obtained from natural fats and oils by degradation processes such as alcoholysis or ozonolysis and subsequent chemical linking, for example by transesterification or dimerization, of the obtained degradation products or derivatives thereof. Suitable degradation products of natural fats and oils are in particular fatty acids and fatty alcohols, and also fatty acid esters, especially the methyl esters (FAME), which can be derivatized for example by hydroformylation and hydrogenation to give hydroxy fatty acid esters.

Likewise suitable are also polyhydrocarbon polyols, also called oligohydrocarbonols, for example polyhydroxy-functional ethylene-propylene, ethylene-butylene or ethylene-propylene-diene copolymers, as are produced for example by Kraton Polymers, USA, or polyhydroxy-functional copolymers of dienes such as 1,3-butadiene or diene mixtures and vinyl monomers such as styrene, acrylonitrile or isobutylene, or polyhydroxy-functional polybutadiene polyols, for example those which are prepared by copolymerization of 1,3-butadiene and allyl alcohol and may also be hydrogenated.

Also suitable are polyhydroxy-functional acrylonitrile/butadiene copolymers as can be produced for example from epoxides or amino alcohols and carboxyl-terminated acrylonitrile/butadiene copolymers, which are commercially available under the name Hypro® CTBN from Emerald Performance Materials, LLC, USA.

Commercially available polyisocyanates may be used as polyisocyanates for the preparation of the prepolymer. Preferably, diisocyanates are used, particularly preferably monomeric diisocyanates having a molecular weight in the range from 140 to 400 g/mol and having aliphatically, cycloaliphatically, araliphatically and/or aromatically bonded isocyanate groups.

Suitable monomeric diisocyanates are in particular those from a group of polyisocyanates comprising 1,4-diisocyanatobutane (BDI), 1,5-diisocyanatopentane (PDI), hexamethylene 1,6-diisocyanate (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bis(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI), bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and mixtures thereof.

Further diisocyanates which are likewise suitable are additionally found, for example, in Justus Liebigs Annalen der Chemie Volume 562 (1949) p. 75-136.

In a preferred embodiment, the polyisocyanate is selected from the group consisting of 1-isocyanato-3,3,5-trimethyl-5-isocyanatomethylcyclohexane (IPDI), 1,6-hexamethylene diisocyanate (HDI), 2,4- and/or 2,6-tolylene diisocyanate (TDI), 2,4'- and 4,4'-diisocyanatodiphenylmethane (MDI), H12MDI and mixtures thereof.

In a further preferred embodiment, the polyisocyanate is a mixture comprising 4,4'-diisocyanatodiphenylmethane and homologous polynuclear compounds (PMDI), produced for example by phosgenation of reaction products of aniline and formaldehyde, the production of which is described, for example, in WO/2017/125302.

In a further embodiment, the polyisocyanate composition A comprises isocyanate-terminated prepolymers which, in addition to the isocyanate group, comprise further non-functional groups which do not react with isocyanate groups. These are preferably silane groups. The prepolymers are then prepolymers containing isocyanate and silane groups. "Silane group" in this case refers to an organosilicon group having at least one organic radical bonded via an Si—O bond, for example an alkoxy or acyloxy group. Such silane groups are also known to those skilled in the art as organoalkoxysilane or organoacyloxysilane. Silanes have the property of hydrolyzing on contact with moisture to afford organosilanols, that is to say of forming groups having at least one silanol group (Si—OH group), and of polymerizing as a result of subsequent condensation to afford organosiloxanes. Silane or silanol groups can also react with polar groups on the substrate surface to form covalent bonds, which can improve the adhesion of adhesives to substrates. Isocyanate-terminated prepolymers which comprise silane groups in addition to the isocyanate group can be prepared in ways known to those skilled in the art. For example, they can be prepared by reacting polymers comprising isocyanate groups and isocyanate-reactive groups in one molecule with isocyanatosilanes such as for example 3-isocyanatopropyltrimethoxysilane, 3-isocyanatopropyltriethoxysilane, 1-isocyanatomethyltrimethoxysilane, 1-isocyanatomethyltriethoxysilane, 1-isocyanatomethylmethyldimethoxysilane, 1-isocyanatomethylmethyldiethoxysilane. Another exemplary production method comprises the reaction of the isocyanate-terminated prepolymers described above with hydroxy-, thio- or aminosilanes, the hydroxy, amino and thio groups being reacted with the isocyanate groups in a stoichiometric deficit. Preference is given to using aminosilanes, particularly preferably secondary aminosilanes, such as, for example, N-butyl-N-propyltrimethoxysilane or N-cyclohexal-N-methylmethyldimethoxysilane. Here, all silanes can also be present in the form of their oligomers containing siloxane groups.

In a further embodiment, the polyisocyanate composition A comprises isocyanate-terminated prepolymers which, in addition to the isocyanate group, comprise epoxy groups; the compounds are then prepolymers containing isocyanate and epoxy groups.

Catalyst B

Any catalyst is suitable as catalyst B which catalyzes the crosslinking of isocyanate groups to form isocyanurate groups and/or uretdione groups at 23° C. A test method for determining the suitability of the catalyst involves filling 20 g of a mixture of polyisocyanate composition A and the catalyst to be tested into a glass vessel having a volume of 25 ml, which is then blanketed with dry nitrogen, sealed and stored at 23° C. Here, polyisocyanates having aromatically bonded isocyanate groups are represented as model compound by an isocyanate-polypropylene oxide polyether prepolymer, methylene diphenyl diisocyanate structural component, NCO content ca. 15.4 percent by weight, NCO functionality ca. 2.1, viscosity ca. 1800 mPas. Polyisocyanates having aliphatically and/or cycloaliphatically bonded isocyanate groups are represented as model compound by a polyisocyanurate, structural component HDI, NCO content ca. 21.8 percent by weight, NCO functionality ca. 3.4, viscosity ca. 3000, residual monomer content at most 0.15%.

If this test does not exhibit any curing, the amount of catalyst is doubled in each case in further tests up to a catalyst content of a maximum of 5% by weight (based on the catalytically active fraction, without solvent).

At a concentration of at most 5% by weight, suitable catalysts result in curing of the reaction mixture within 24 hours, which is defined by the fact that the mass solidifies and, if the bottle is held with the opening facing down, less than 10% by weight of the content flows out of the bottle within 30 minutes at 23° C. It is preferred here that in the period of time of 24 hours after mixing with the polyisocyanate at least 20%, more preferably at least 30%, particularly preferably at least 50% of the free isocyanate groups present in the polyisocyanate composition A react to form isocyanurate groups.

In the present application, "catalyst" is also understood to mean a mixture of different compounds, provided that this mixture has the desired catalytic activity.

Suitable catalysts B for the process according to the invention are in principle all compounds which accelerate the trimerization of isocyanate groups to isocyanurate structures at temperatures of at most 50° C., preferably at most 40° C. and very preferably at most 30° C. and especially preferably at most 23° C. This property of a potential catalyst can be determined by performing the test described above at the relevant temperature. Since isocyanurate formation, depending on the catalyst used, is often accompanied by side reactions, for example dimerization to form uretdione structures or trimerization with the formation of iminoxadiazinediones (so-called asymmetric trimerizates), the term "trimerization" in the context of the present invention is also intended to be synonymous with these additional oligomerization reactions in which isocyanate groups preferably react with at least one other isocyanate group.

The compounds described below are particularly suitable as candidates for the test method described above. It is to be expected that a relevant proportion of these will meet the criteria.

These include, for example, simple tertiary amines such as for example triethylamine, tributylamine, N,N-dimethylaniline, N-ethylpiperidine or N,N'-dimethylpiperazine. Suitable catalysts also include the tertiary hydroxyalkylamines described in GB 2 221 465, such as for example triethanolamine, N-methyldiethanolamine, dimethylethanolamine, N-isopropyldiethanolamine and 1-(2-hydroxyethyl)pyrrolidine, or the catalyst systems that are known from GB 2 222 161 and consist of mixtures of tertiary bicyclic amines, for example DBU, with simple low molecular weight aliphatic alcohols.

A large number of different metal compounds are also possible as candidates. Suitable examples are the octoates and naphthenates of manganese, iron, cobalt, nickel, copper, zinc, zirconium, cerium or lead or mixtures thereof with acetates of lithium, sodium, potassium, calcium or barium that are described as catalysts in DE-A 3 240 613, the sodium and potassium salts of linear or branched alkanecarboxylic acids having up to 10 carbon atoms that are disclosed by DE-A 3 219 608, such as of propionic acid, butyric acid, valeric acid, caproic acid, heptanoic acid, caprylic acid, pelargonic acid, capric acid and undecyl acid, the alkali metal or alkaline earth metal salts of aliphatic, cycloaliphatic or aromatic mono- and polycarboxylic acids having 2 to 20 carbon atoms that are disclosed by EP-A 0 100 129, such as sodium benzoate or potassium benzoate, the alkali metal phenoxides disclosed by GB-A 1 391 066 and GB-A 1 386 399, such as sodium phenoxide or potassium phenoxide, the alkali metal and alkaline earth metal oxides, hydroxides, carbonates, alkoxides and phenoxides disclosed by GB 809 809, alkali metal salts of enolizable compounds and metal salts of weak aliphatic or cycloaliphatic carboxylic acids such as sodium methoxide, sodium acetate, potassium acetate, sodium acetoacetate, lead 2-ethylhexanoate, and lead naphthenate, the basic alkali metal compounds complexed with crown ethers or polyether alcohols that are disclosed by EP-A 0 056 158 and EP-A 0 056 159, such as complexed sodium carboxylates or potassium carboxylates, the pyrrolidinone potassium salt disclosed by EP-A 0 033 581, the mono- or polynuclear complex of titanium, zirconium and/or hafnium disclosed by application EP 13196508.9, such as zirconium tetra-n-butoxide, zirconium tetra-2-ethylhexanoate and zirconium tetra-2-ethylhexoxide, and tin compounds of the type described in European Polymer Journal, vol. 16, 147-148 (1979), such as dibutyltin dichloride, diphenyltin dichloride, triphenylstannanol, tributyltin acetate, tributyltin oxide, tin octoate, dibutyl (dimethoxy)stannane and tributyltin imidazolate.

Further potentially suitable compounds are the quaternary ammonium hydroxides known from DE-A 1 667 309, EP-A 0 013 880 and EP-A 0 047 452, for example tetraethylammonium hydroxide, trimethylbenzylammonium hydroxide, N,N-dimethyl-N-dodecyl-N-(2-hydroxyethyl)ammonium hydroxide, N-(2-hydroxyethyl)-N,N-dimethyl-N-(2,2'-dihydroxymethylbutyl)ammonium hydroxide and 1-(2-hydroxyethyl)-1,4-diazabicyclo[2.2.2]octane hydroxide (monoadduct of ethylene oxide and water onto 1,4-diazabicyclo [2.2.2]octane), the cyclic ammonium salts known from WO 2017/029266, the spirocyclic ammonium salts known from WO 2015/124504, the quaternary hydroxyalkylammonium hydroxides known from EP-A 37 65 or EP-A 10 589, for example N,N,N-trimethyl-N-(2-hydroxyethyl)ammonium hydroxide, the trialkylhydroxylalkylammonium carboxylates that are known from DE-A 2631733, EP-A 0 671 426, EP-A 1 599 526 and U.S. Pat. No. 4,789,705, for example N,N,N-trimethyl-N-2-hydroxypropylammonium p-tert-butylbenzoate and N,N,N-trimethyl-N-2-hydroxypropylammonium 2-ethylhexanoate, the quaternary benzylammonium carboxylates known from EP-A 1 229 016, for example N-benzyl-N,N-dimethyl-N-ethylammonium pivalate, N-benzyl-N,N-dimethyl-N-ethylammonium 2-ethylhexanoate, N-benzyl-N,N,N-tributylammonium 2-ethylhexanoate, N,N-dimethyl-N-ethyl-N-(4-methoxybenzyl)ammonium 2-ethylhexanoate or N,N,N-tributyl-N-(4-methoxybenzyl) ammonium pivalate, the tetrasubstituted ammonium β-hydroxycarboxylates known from WO 2005/087828, for example tetramethylammonium lactate, the quaternary ammonium or phosphonium fluorides known from EP-A 0 339 396, EP-A 0 379 914 and EP-A 0 443 167, for example N-methyl-N,N,N-trialkylammonium fluorides with C8-C10-alkyl radicals, N,N,N,N-tetra-n-butylammonium fluoride, N,N,N-trimethyl-N-benzylammonium fluoride, tetramethylphosphonium fluoride, tetraethylphosphonium fluoride or tetra-n-butylphosphonium fluoride, the quaternary ammonium and phosphonium polyfluorides known from EP-A 0 798 299, EP-A 0 896 009 and EP-A 0 962 455, for example benzyltrimethylammonium hydrogen polyfluoride, the tetraalkylammonium alkylcarbonates which are known from EP-A 0 668 271 and are obtainable by reaction of tertiary amines with dialkyl carbonates, or betaine-structured quaternary ammonioalkyl carbonates, the quaternary ammonium hydrogencarbonates known from WO 1999/023128, for example choline bicarbonate, the quaternary ammonium salts which are known from EP 0 102 482 and are obtainable from tertiary amines and alkylating esters of phosphorus acids, examples of such salts being reaction products of triethylamine, DABCO or N-methylmorpholine with dimethyl methanephosphonate, or the tetrasubstituted ammonium salts of lactams that are known from WO 2013/167404, for example trioctylammonium caprolactamate or dodecyltrimethylammonium caprolactamate.

A list of further potentially suitable trimerization catalysts can be found, for example, in J. H. Saunders and K. C. Frisch, Polyurethanes Chemistry and Technology, p. 94 ff. (1962) and the literature cited therein.

For aliphatic and cycloaliphatic isocyanates the following are most likely suitable: carboxylates and alkoxides, preferably carboxylates and alkoxides with alkali metal or alkaline earth metal counterions. In this case, the catalysts are optionally activated by adding additives such as crown ethers, ethers, amines, acetonates, etc. which complex the metallic counterions. Particular preference is given to alkoxides and carboxylates of alkaline earth metals, potassium neodecanoate and potassium octoate being especially preferred.

Also potentially suitable are quaternary ammonium and phosphonium fluorides or difluorides.

Tetrabutylphosphonium fluoride (C16H37F2P, CAS No. 121240) and potassium acetate have been proven to be suitable.

For aromatic and araliphatic isocyanates the following are most likely suitable: carboxylates and alkoxides, preferably carboxylates and alkoxides with alkali metal or alkaline earth metal counterions. In this case, the catalysts are optionally activated by adding additives such as crown ethers, ethers, amines, acetonates, etc. which complex the metallic counterions. Particular preference is given to the alkoxides and carboxylates of the alkaline earth metals. Potassium acetate, potassium neodecanoate and tetrabutylphosphonium fluoride have been proven to be suitable.

Isocyanate-Reactive Compound C

In a preferred embodiment of the present invention, the coating composition according to the invention additionally comprises a compound C comprising groups reactive with isocyanate groups. Groups reactive to isocyanate groups are hydroxyl, thiol and amino groups. The isocyanate-reactive compound C preferably comprises an average of at least 1.0, more preferably at least 1.5, and even more preferably at least 2.1 isocyanate-reactive groups per molecule. The average functionality per molecule is preferably at most 3.0. It is essential to the invention that the isocyanate group content of the coating composition is at least 5% by weight even in the presence of an isocyanate-reactive compound C. It is also preferred that the molar ratios of isocyanate groups to isocyanate-reactive groups defined further above in this application are adhered to.

It is also possible to use a significantly lower index if the reaction of the isocyanate groups with one another with trimerization is significantly higher than the reaction with the isocyanate-reactive groups so that, as a result, most of the groups react with trimerization. It may also be that the compound C does not participate in any reaction, but may also act as a plasticizer or the like.

Preferred isocyanate-reactive compounds C are low molecular weight polyols having a functionality of at least two hydroxyl groups per molecule and a molecular weight of at most 500 g/mol. Particularly preferred compounds C are ethanol, 1-propanol, 1-butanol, ethanediol, glycol, 1,2,10-decanetriol, 1,2,8-octanetriol, 1,2,3-trihydroxybenzene, glycerol, 1,1,1-trimethylolpropane, 1,1,1-trimethylolethane, pentaerythritol and sugar alcohols, 1,3-propandiol, 1,2-propandiol, 1,4-butanediol, 1,3-butanediol, 1,5-pentanediol, 1,6-hexanediol, 1,4-pentanediol, diethylene glycol, triethylene glycol, neopentyl glycol, amino alcohols, polyethylene glycol (PEG) 200, PEG 300, PEG 400, PEG 600, diethanolamine and triethanolamine.

The polymeric polyols described earlier in this application as structural components of the isocyanate-terminated prepolymers can also be used, provided they have an average functionality of isocyanate-reactive groups between 1.0 and 4.0.

To improve the adhesion, the coating composition may comprise an isocyanate-reactive compound C having an average functionality between 1.0 and 3.0. This isocyanate-reactive compound C may be combined with at least one further isocyanate-reactive compound C having an average functionality of at least 1.0.

In particular, primary amines and/or amino alcohols may be suitable as isocyanate-reactive compound C, in particular in order to directly obtain a structurally viscous, less strongly flowing or slipping material by mixing components C and A. Primary amines suitable for this purpose are in particular 1,5-diamino-2-methylpentane, 2,2(4), 4-trimethylhexamethylenediamine, 1,8-octanediamine, 1,10-decanediamine, 1,12-dodecanediamine, 1-amino-3-aminomethyl-3,5,5-trimethylcyclohexane, 2- and 4-methyl-1,3-diaminocyclohexane and mixtures thereof, 1,3-bis (aminomethyl)cyclohexane, 1,4-bis (aminomethyl) cyclohexane, 4,4'-methylenebis (cyclohexylamine), bis(2-aminoethyl) ether, 3,6-dioxaoctane-1,8-diamine, 4,7-dioxadecane-1,10-diamine, 4,7-dioxadecane 2,9-diamine, 4,9-dioxadodecane-1,12-diamine, 5,8-dioxadodecane-3,10-diamine, 1,3-bis (aminomethyl)benzene or a polyetheramine such as in particular Jeffamine® D-230, D-400 or T-403 (from Huntsman), ethanolamine, diethanolamine and others.

Filler D

Examples of suitable fillers are chalk, powdered lime, precipitated and/or fumed silica, zeolites, bentonites, magnesium carbonate, kieselguhr, alumina, clay, talc, titanium oxide, iron oxide, zinc oxide, sand, quartz, flint, mica, glass powder and other ground mineral materials. Furthermore, organic fillers can also be used, in particular carbon black, graphite, wood fibers, wood flour, sawdust, cellulose, cotton, pulp, wood chips, chippings, chaff, ground walnut shells and other short cuts of fibers and other organic or inorganic pigments. Short fibers such as glass fiber, glass filament, polyacrylonitrile, carbon fiber, Kevlar fiber or polyethylene fibers can also be added. Aluminum powder is likewise suitable as a filler. In addition, hollow spheres with a mineral shell or a plastics shell are suitable as fillers. These can, for example, be hollow glass spheres which are commercially available under the trade names Glass Bubbles®. Plastic-based hollow spheres are commercially available, for example, under the names Expancel® or Dualite®. These are composed of inorganic or organic materials, each with a diameter of 1 mm or less, preferably of 500 µm or less.

For example, the filler used is a finely divided silica having a BET surface area of 10 to 500 $m^2/g$. When used, such a silica does not bring about any substantial increase in the viscosity of the composition according to the invention, but it does contribute to a strengthening of the cured preparation. This strengthening for example improves the initial strengths, tensile shear strengths and the adhesion of the adhesives, sealants or coating materials in which the composition according to the invention is used. Uncoated silicas having a BET surface area of less than 100 $m^2/g$, more preferably less than 65 $m^2/g$, and/or coated silicas having a BET surface area of 100 to 400 $m^2/g$, more preferably of 100 to 300 $m^2/g$, in particular from 150 to 300 $m^2/g$ and especially preferably from 200 to 300 $m^2/g$ are preferably used.

Alkali metal aluminosilicates are preferably used as zeolites, for example sodium-potassium aluminosilicates of the general empirical formula aK2O*bNa2O*Al2O3*2SiO*nH2O where 0<a, b<1 and a+b=1. The pore opening of the zeolite used or of the zeolites used is preferably just large enough to accommodate water molecules. Accordingly, an effective pore opening of the zeolites of less than 0.4 nm is preferred. The effective pore opening is particularly preferably 0.3 nm±0.02 nm. The zeolite(s) is/are preferably used in the form of a powder.

In one embodiment, the filler comprises naturally occurring silicates (for example clay, loam, talc, mica, kaolin), carbonates (for example chalk, dolomite), sulfates (for example baryte), quartz sand, silica (especially precipitated or fumed silica), metal hydroxides (for example aluminum hydroxide, magnesium hydroxide), metal oxides (for example zinc oxide, calcium oxide, aluminum oxide) and/or carbon black.

Chalk is preferably used as filler. The chalk used here may be cubic, non-cubic, amorphous and other polymorphs of magnesium and/or calcium carbonate. The chalks used are preferably surface-treated or coated. Coating compositions used for this purpose are preferably fatty acids, fatty acid soaps and fatty acid esters, for example lauric acid, palmitic acid or stearic acid, sodium or potassium salts of such acids or the alkyl esters thereof. In addition, however, other surface-active substances such as sulfate esters of long-chain alcohols or alkylbenzenesulfonic acids or the sodium or potassium salts thereof or else coupling reagents based on silanes or titanates are also suitable. The surface treatment of the chalks is frequently associated with an improvement in the processibility, and also in the bonding force and also the weather resistance of the compositions. The coating composition is for this purpose typically used in a proportion of 0.1% to 20% by weight, preferably 1% to 5% by weight, based on the total weight of the untreated chalk.

Depending on the profile of properties sought, precipitated or ground chalks or mixtures thereof may be used. Ground chalks may for example be produced from natural lime, limestone or marble by mechanical grinding, with dry or wet methods possibly being used. Depending on the grinding method, fractions of different average particle size are obtained. Advantageous specific surface area values (BET) are between 1.5 $m^2/g$ and 50 $m^2/g$.

The fillers used to produce the composition usually have a certain proportion of water, which can possibly lead to an undesired urea formation and elimination of carbon dioxide. Preferably, the filler comprises water in an amount of up to 1% by weight, preferably 0.005% to 0.5% by weight, particularly preferably 0.01% to 0.3% by weight, based on the mass of the filler, measured according to the method in/of DIN EN ISO 15512:2017-03, method B2.

Additives E

In addition to the components A, B, and optionally C and D, the coating composition may optionally comprise additional components (additives).

For example, compounds may be used as additives which increase the adhesion of the coating composition according to the invention to specific substrates. These can be, for example, purely physically acting compounds (for example so-called tackifiers), or compounds that are able to react with reactive groups on the substrate surface.

For example, compounds may be used as additives which produce a uniform joint thickness, for example wires, beads, etc. made of metal or glass or ceramic.

The following additives may be used, for example: non-reactive thermoplastic polymers such as homopolymers or copolymers of unsaturated monomers, in particular from the group comprising ethylene, propylene, butylene, isobutylene, isoprene, vinyl acetate and alkyl (meth)acrylates, in particular polyethylene (PE), polypropylene (PP), polyisobutylene, ethylene vinyl acetate copolymers (EVA) and atactic poly-α-olefins (APAO).

The following may be used as additives, for example: plasticizers, in particular phthalates, trimellitates, adipates, sebacates, azelates, citrates, benzoates, diesters of ortho-cyclohexanedicarboxylic acid, acetylated glycerol or monoglycerides, or hydrocarbon resins;

The following may be used as additives, for example: rheology modifiers, in particular thickeners or thixotropic agents, for example sheet silicates such as bentonites, derivatives of castor oil, hydrogenated castor oil, polyamides, polyamide waxes, polyurethanes, urea compounds, fumed silicas, cellulose ethers and hydrophobically modified polyoxyethylenes.

The following may be used as additives, for example: desiccants, such as molecular sieves, calcium oxide, highly reactive isocyanates such as p-tosyl isocyanate, monomeric diisocyanates, monooxazolidines such as Incozol® 2 (from Incorez), orthoformates, alkoxysilanes such as tetraethoxysilane, organoalkoxysilanes such as vinyltrimethoxysilane; adhesion promoters, for example organoalkoxysilanes such as aminosilanes, mercaptosilanes, epoxysilanes, vinylsilanes, (meth) acrylic silanes, isocyanatosilanes, carbamatosilanes, alkylsilanes, S-(alkylcarbonyl)mercaptosilanes and aldiminosilanes, and oligomeric forms of these silanes.

The following may be used as additives, for example: Stabilizers against oxidation, heat, light and UV radiation.

The following additives may be used, for example: flame-retardant substances, in particular the aforementioned fillers aluminum hydroxide and magnesium hydroxide, and in particular organic phosphoric acid esters such as, in particular, triethyl phosphate, tricresyl phosphate, triphenyl phosphate, diphenyl cresyl phosphate, isodecyldiphenyl phosphate, tris(1,3-dichloro-2-propyl) phosphate, tris(2-chloroethyl) phosphate, tris(2-ethylhexyl) phosphate, tris (chloroisopropyl) phosphate, tris (chloropropyl) phosphate, isopropylated triphenyl phosphate, mono-, bis- and tris (isopropylphenyl) phosphates with different degrees of isopropylation, resorcinol bis(diphenyl phosphate), bisphenol A bis (diphenyl phosphate) or ammonium polyphosphates, melamine and melamine derivatives such as phosphates or isocyanurates, expanding graphites, zinc borates or antimony trioxide.

The following can be used as additives, for example: surface-active substances, in particular wetting agents, leveling agents, deaerating agents or defoamers.

The following may be used as additives, for example: biocides such as algicides, fungicides or substances that inhibit fungal growth.

Preferred additives are rheology modifiers, adhesion promoters, drying agents or stabilizers against UV light and/or oxidation.

In a particularly preferred embodiment of the present invention, the coating composition according to the invention also comprises at least one urethanization catalyst. This is particularly preferred when the composition comprises compounds C.

Advantages

A large number of catalysts which do not comprise any transition metals are available for the coating composition according to the invention. This is advantageous for reasons of environmental and occupational protection.

Unlike adhesives which cure by formation of urea groups, the coating composition according to the invention does not require any moisture for curing. This means, in particular, that adhesive joints can cure with exclusion of air, since no access to air humidity is required. Reaction of water with isocyanate groups also produces carbon dioxide. This can lead to the formation of air bubbles in the adhesive joint and is unfavorable for the mechanical properties, since the air bubbles are weak points. This can be acceptable in the case of thin adhesive layers that result in thin adhesive joints, since little carbon dioxide is formed here. With thicker adhesive joints, however, correspondingly more carbon dioxide is produced, which results in larger bubbles and thus to more pronounced weak points.

Unlike the known two-component polyurethane systems, the coating compositions according to the invention are comparatively insensitive to mixing errors. A slightly different mixing ratio of catalyst and polyisocyanate composition may potentially lead to slightly faster or slower curing. However, it has only a minor influence on the final strength of the adhesive joint.

The coating compositions according to the invention are also particularly suitable for bonding components which have been coated with cathode electrodeposition material.

To date, the bonding of such components required weighing up two disadvantages: two-component polyurethane adhesives adhere very well to the components. However, intrinsically they have a comparatively low tensile shear strength and/or generally only have a short pot life.

The cause of the adhesive failure is coupled to the intrinsic strength of the adhesive (cohesion) and to the bond strength (adhesion). If cohesion and adhesion are greater than the substrate strength, then the substrate will be destroyed during the adhesive test. This is generally the preferred mode of failure of an adhesive.

The study on which this invention is based has shown that the coating compositions according to the invention have very good adhesion to the cathode electrodeposition material coating and at the same time have high intrinsic strength. In many cases, the relevant adhesive joints fail because the cathode electrodeposition coating tears off the substrate, i.e. adhesion and intrinsic tensile shear strength of the coating composition according to the invention are no longer the properties which limit the load-bearing capacity of the adhesive joint.

Use

In the study on which the present patent application is based, it has been found, surprisingly, that the coating compositions described above cure without the action of atmospheric moisture and at room temperature and still exhibit very good strengths even at temperatures significantly above room temperature. Therefore, in a further embodiment, the present invention relates to the use of the adhesive composition according to the invention defined further above in this patent application for producing an adhesive joint.

The adhesive joint can be produced in any manner known to those skilled in the art. The coating composition is preferably applied to at least one of the two substrates to be bonded before the two substrates with the surfaces to be bonded are brought into contact with each other. This can be done under pressure if necessary. The substrates are then incubated at at least 10° C., preferably at least 15° C., more preferably at least 20° C. and most preferably at least 23° C. until the coating composition has cured, without moving them against each other. The upper limit of the temperature during curing is given by the decomposition temperature of the coating composition or the workpieces to be bonded. It is preferably 250° C.

Since the catalysts that can be used according to the invention preferably already enable curing at 23° C., curing in the context of the use according to the invention preferably takes place at temperatures between 10° C. and 60° C., more preferably between 15° C. and 50° C., particularly preferably between 15° C. and 40° C.

Present in a cured coating composition is at most 20%, preferably at most 10% of the free isocyanate groups originally present in the polyisocyanate composition A. This state is preferably achieved after curing at temperatures between 10° C. and 60° C. for 24 hours. Particularly preferably, after curing at temperatures between 10° C. and 40° C. for 24 hours, a state is reached in which at most 20% of the free isocyanate groups originally present in the polyisocyanate composition A remain. The content of isocyanate groups can be determined by IR spectroscopy as described elsewhere in this application.

Since the curing of the coating composition according to the invention does not depend on the formation of urea groups, no moisture is required. Therefore, preference is given to using a coating composition having a water content of at most 1.5% by weight. The curing can also take place with exclusion of air, since neither input of air humidity nor the escape of carbon dioxide is necessary. The water content is calculated by adding the water present in free form in the coating composition and the water bound to the substrate. The latter is also accessible in principle, albeit delayed, for the reaction to give urea groups, since the binding to the substrate is reversible.

Substrates which are impermeable or partially impermeable to air and moisture are particularly preferably bonded. These are preferably metal, plastic and dry wood, more preferably metal and plastic. "Dry wood" is wood having a residual moisture content determined according to EN 13183-1 (kiln method) of at most 10% by weight, more preferably at most 5% by weight. The substrates can be precoated, for example with paints. It is preferred that the coating composition is applied to an area which has an extension of at least 5 mm in both dimensions.

In a preferred embodiment of the present invention, the adhesive joint has an average thickness of at least 0.001 mm, preferably 0.05 mm, particularly preferably 0.1 mm and especially preferably at least 1 mm.

In principle, the method according to the invention is suitable for bonding all surfaces. Preference is given to surfaces made of glass, ceramic, glass ceramic, concrete, mortar, brick, tiles, gypsum, natural stone, metal, plastic, leather, paper, wood, resin-bonded wood-based materials, textiles, resin-textile composite materials and polymer composite materials.

Metals are preferably copper, iron, steel, non-ferrous metals and alloys which comprise the aforementioned metals. The metal can be surface-refined, in particular by chrome-plating or galvanizing.

Preferred plastics are polyvinyl chloride, polycarbonate, acrylonitrile-butadiene-styrene copolymer, polymethyl methacrylate, polyethylene, polypropylene, ethylene-propylene copolymers, polyamide, polyester, epoxy resins, polyoxmethylene, ethylene-propylene-diene rubber and styrene-acrylonitrile copolymer.

Since the coating composition according to the invention also cures in the absence of moisture, it is particularly suitable for bonding surfaces consisting of metal, plastic or dry wood, particularly preferably consisting of plastic or metal. The use for bonding metal surfaces which have been precoated with cathode electrodeposition material is also preferred. It is especially preferred here that both surfaces consist of metal, in particular metal coated with a cathode electrodepostion material, or plastic.

The study on which the present study is based has shown that the coating compositions according to the invention are particularly suitable for bonding metal parts that have been precoated with a cathode electrodeposition material. Therefore, in a particularly preferred embodiment of the present invention, at least one of the substrates to be bonded by the adhesive joint consists of metal which has been coated with a cathode electrodeposition material at the point where the coating composition is applied.

A cathode electrodeposition material is a dip primer deposited electrophoretically from an aqueous phase. The binders used for this purpose include compounds comprising blocked isocyanate groups which engage in crosslinking reactions under the conditions in the baking oven in automotive series painting with elimination of a blocking agent, described in Meier-Westhues, Polyurethane Lacquers, Adhesives and Sealants, Vincenz Network, 2007, Hanover, pages 144-145.

Process

In yet a further embodiment, the present invention relates to a process for producing an adhesive joint comprising the steps of
a) applying the coating composition according to the invention to a surface;
b) contacting the coated surface with a further surface; and
c) curing the coating composition at a temperature of at least 10° C. and at most 60° C.

All of the definitions given above for the coating composition and its use also apply to this embodiment.

The coating composition can be applied by all methods known to those skilled in the art and which are suitable for compositions of the viscosity in question.

The term "contacting" refers to a process in which the surface coated with the coating composition is physically brought together with the other surface, so that no air gap remains between the two surfaces.

In accordance with the invention, it is also possible to coat the other surface with a coating composition according to the invention before both surfaces are contacted.

In the cured coating composition, at least 5%, preferably at least 20%, more preferably at least 35% and especially preferably at least 50% of the isocyanate groups present in the coating composition at the start of process step b) are converted to isocyanurate groups. At the same time, the proportion of isocyanate groups converted to urea groups is at most 30%, preferably at most 20% and especially preferably at most 10% of the isocyanate groups present in the coating composition at the start of process step b).

In one embodiment of the present invention, it is furthermore possible that the curing step c) is carried out at a variable, preferably increasing, temperature. Process step c) is preferably carried out in this case at a temperature of at most 40° C. until a tensile shear strength of at least 0.5 N/mm$^2$, preferably at least 2 N/mm$^2$ and especially preferably at least 4 N/mm$^2$ is achieved. The process step is then continued at a temperature of at least 40° C. until a higher strength of preferably at least 2 N/mm$^2$, preferably at least 4 N/mm$^2$, particularly preferably at least 6 N/mm$^2$ and especially preferably at least 8 N/mm$^2$ is reached. More preferably, the curing continues at at least 50° C. In order to avoid decomposition of the adhesive, curing takes place at a maximum of 300° C. The tensile shear strength is preferably determined according to DIN EN 1465, Adhesives, Determination of the tensile lap-shear strength of bonded assemblies.

Since the polyisocyanate component A cures in the presence of catalysts B in coating compositions according to the invention within a few hours and becomes solid or experiences an increase in viscosity which would make contacting the substrate surfaces more difficult, the coating compositions according to the invention should be prepared sufficiently shortly before application.

The period of time in which an adhesive composition provided by mixing its components can still be processed is referred to as the "pot life". The end of processability is preferably defined by a doubling of the viscosity of the coating composition or, more preferably, by thread breakage when a stirrer bar is pulled out of the coating composition. The production of an adhesive joint using a coating composition that has exceeded its pot life can result in malfunctions such as, for example, a slowed or incomplete build-up of the adhesion to the substrate.

In a preferred embodiment of the present invention, the process according to the invention comprises a further process step, in the course of which the components of the coating composition according to the invention are mixed as described below. This process step takes place before process step a). It is preferred that the period of time between the provision of the coating composition according to the invention by mixing its components and the end of process step b) is not greater than the pot life of the coating composition used. It is particularly preferred that the period of time between the provision of the coating composition according to the invention and the end of process step b) is at least 5 minutes, preferably at least 10 minutes and particularly preferably at least 30 minutes.

The components A, B, C and E of the coating compositions according to the invention suitably have a consistency such that they can be mixed well with one another and with the fillers D using simple processes. Liquid and also pasty components A, B, C and E are particularly suitable for this purpose, the viscosity of the liquid or pasty components being comparatively low at room temperature. This means that metering and mixing can be carried out in a simple manner by hand or using commercially available metering systems and dynamic or static mixers. Alternatively, dispersing devices can be used if, for example, solid fillers have to be incorporated.

In a preferred process, all components A to E used in the coating compositions according to the invention are pre-mixed in such a way that in each case one component X1 and X2 are present separately from each another and these can be mixed immediately before application. In this case, X1 comprises the polyisocyanate component A and X2 the catalyst according to the invention. Additives and fillers may be present in component X1 and/or X2.

Substances that are reactive to isocyanate groups are preferably constituents of component X2. It can be useful to dry certain constituents chemically or physically before mixing them into the respective component, preferably at a low water content of at most 1.5 percent by weight.

X1 and X2 are therefore prepared separately from each other. In this case, the constituents of the respective component X1 and/or X2 are preferably mixed with each other with exclusion of moisture, so that a macroscopically homogeneous mass is produced. Each component is preferably stored in a separate moisture-proof container. A suitable container is in particular a drum, a container, a hobbock, a bucket, a canister, a box, a bag, a tubular bag, a cartridge or a tube. The components X1 and X2 are preferably storage-stable, that is to say that they can be stored in the respective container for several months up to a year or longer prior to use, without their properties changing to an extent relevant to their use.

To apply the composition, the two components are mixed with each other shortly before or during application. In parts by weight, the mixing ratio between X1 and X2 is, for example, in the range from about 1:5 to 200:1, in particular from 1:1 to 20:1.

X1 and X2 are typically mixed using a static mixer or with the aid of dynamic mixers. Mixing can take place continuously or batchwise. When mixing, care should be taken to ensure that the two components X1 and X2 are mixed as homogeneously as possible. In the event of insufficient mixing, local deviations from the advantageous mixing ratio occur, which can result in a deterioration in the mechanical properties.

In yet another embodiment, X2 is first applied to at least one of the substrates to be bonded, while X1 is then applied to the substrate pretreated in this way or at any time point to the other, non-pretreated substrate. Alternatively, the reverse procedure can also be used. The components of the coating composition according to the invention are only then contacted or mixed in the joining process. This process has the advantage that, for example, precoated substrates can be bonded using a 1-component adhesive.

The result of the process according to the invention is an adhesive joint which materially joins the two surfaces and consists of the cured coating composition.

In a further embodiment, the present invention relates to an adhesive joint obtainable by the process described above.

The working examples which follow serve merely to illustrate the invention. They are not intended to limit the scope of the claims in any way.

EXAMPLES

All reported percentages are based on weight unless otherwise stated.

The methods detailed hereinafter for determination of the appropriate parameters are employed for conduction and evaluation of the examples and are also the methods for determination of the parameters of relevance in accordance with the invention in general.

The NCO contents are determined by titrimetric means to DIN EN ISO 11909.

Unless otherwise stated, the water content was determined in accordance with DIN EN ISO 15512: 2017-03, method B2.

The residual monomer contents of isocyanates are measured by gas chromatography according to DIN EN ISO 10283 using an internal standard.

The pot life of the systems was determined as follows: The required amounts of the individual components are weighed into a PE beaker on a balance. In this case, the total weight of the mixture should be at least 50 g. Immediately after the last component has been weighed, a stopwatch is started and the mixture is stirred intensively with a stirrer bar for ca. 1 minute. Every 30 minutes the stirrer bar is pulled out of the mixture and the flow behavior of the mixture is observed. The pot life has been reached and is read off from the stopwatch when the thread breaks and the mixture no longer flows off the stirrer bar.

All viscosity measurements are taken using a Physica MCR 51 rheometer from Anton Paar Germany GmbH (DE) according to DIN EN ISO 3219/A3. Unless otherwise stated, the viscosity specified is determined at 23° C.

In order to be able to observe the curing behavior of catalyzed adhesives and sealants over time, the development of the breaking strength with time is observed. For this purpose, test specimens are prepared which consist of two overlapping glued substrate parts. After specified times, these are then stretched in a destructive tension machine until they break and the required forces are measured (testing of the tensile shear strengths).

The substrates for the preparation of the test specimens were obtained from Rochholl and stored prior to use for at least 1 week during daytime at 23° C./50% rel. humidity.

| Substrate | Length [mm] | Width [mm] | Thickness [mm] | Further details |
|---|---|---|---|---|
| PVC | 96 | 25 | 4 | Komadur ES |
| Eloxal | 96 | 25 | 1.5 | Aluminum specimen alloy 5005A (AlMgl), anodized E6 EV1 |
| Beechwood | 40 | 20 | 5 | Dampened, planed, edges rounded, annual rings 30-90° |
| KTL | 96 | 25 | 0.8 | Steel specimen DC 05, KTL coated, quality Daimler Kathoguard 500 |
| PP | 96 | 25 | 4 | PP natural, Simona DWST |
| PS | 96 | 25 | 4 | White polystyrene, manufacturer Metzeler |

Five test specimens consisting of 2 overlapping bonded substrate parts are required for each measurement. A substrate part is coated with the adhesive to be tested on a length of 20 mm in the longitudinal direction. The second substrate part is placed in such a way that they completely overlap in terms of the width. The length of the overlap is 10 mm in each case. After pressing together by hand, any material emerging from the sides is removed with a spatula. In each case, 10 test specimens are stacked in a press so that the overlapping surfaces are on top of one other. The test specimens are stored at a pressing force of 0.7 N/mm² for a specified time at 23° C./50% rel. humidity and are taken immediately prior to the test. The specified times (pressing times) in each case can be found in the following tables (figures in h).

The tensile shear strength was measured in each case on a tensile testing machine Zwick 1475 universal testing machine in analogy to DIN EN 1465 at a feed rate of 50 mm/min. In this case, the test specimens were stretched up to the breaking point and the maximum force value was determined. The results given correspond to the arithmetic mean of 5 tests.

Process According to the Invention for Producing the Adhesive Compositions

The amounts of the starting polyisocyanates given in the tables below were weighed into a polypropylene beaker together with the amounts of the catalyst component given in the tables below and optionally the amounts of the further additives given in the tables below (plasticizers, fillers, "compounds C") and homogenized with the aid of a speed mixer DAC 150 FVZ (Hauschild, D E) at 2750 rpm for 1 min.

The process according to the invention is employed both for the production of inventive and non-inventive adhesive compositions.

The calculated NCO content of the mixture given in the tables below is calculated from the mass fraction of the various starting polyisocyanates and the NCO contents thereof, and also the mass fractions of the other components.

Process According to the Invention for Selecting the Catalyst

To select the catalysts according to the invention, ca. 20 g of the model substance for the starting polyisocyanate A together with 0.6 g (based on the active component) of the catalyst component are weighed into a polypropylene beaker and homogenized with the aid of a DAC 150 FVZ speed mixer (Hauschild, D E) at 2750 rpm for 1 min. 20 g of the mixture are filled into a glass bottle (volume 25 ml, opening diameter 1.7 cm) under dry nitrogen and this is stored tightly sealed at 23° C. for 168 hours. The condition of the mixture is then assessed. For this purpose, the bottle is opened and held with the opening face down for 10 minutes over a glass beaker of known weight so that all material that has flowed through the opening is collected. Optionally, the material that has flowed out is transferred into the glass beaker using a sheet of card. It is determined whether more or less than 10% of the amount of material has flowed out of the bottle.

In the case of obviously liquid material (viscosity at 23° C. at most 5 Pas), the pouring test can be dispensed with, as it is assumed that more than 10% of the material will pour out.

In this connection, polyisocyanates having aromatically bonded isocyanate groups are represented as model compound by Desmodur® E 23 (isocyanate-polyether prepolymer, MDI structural component, NCO content ca. 15.4 percent by weight, NCO functionality ca. 2.1, viscosity ca. 1800 mPas), available from Covestro Deutschland AG. Polyisocyanates having aliphatically bonded isocyanate groups are represented as model compound by Desmodur N® 3300 (polyisocyanurate, HDI structural component, NCO content ca. 21.8 percent by weight, NCO functionality ca. 3.4, viscosity ca. 3000) available from Covestro Deutschland AG. If these products are not accessible, those skilled in the art can use analogous substitute products having a comparable composition. When using in each case the same diisocyanate as structural component, it is important to ensure that the NCO functionality and NCO content are as similar as possible. The preparation methods are known to those skilled in the art or are described in the literature.

As a model compound for compounds having cycloaliphatically bonded isocyanate groups, an isocyanate prepolymer having an NCO content of 27% based on a polypropylene polyether of nominal OH functionality of 2, hydroxyl number 112 mg KOH/g and isophorone diisocyanate is suitable. This model substance can be prepared by reacting 226 g of Desmophen 1110 BD (Covestro, linear polypropylene polyether polyol, hydroxyl number 112 mg KOH/g, acidity at most 0.1 mg KOH/g, viscosity at 25° C. ca. 140 mPas, water content 0.05%) and 744 g of Desmodur I (Covestro, isophorone diisocyanate (IPDI), purity (GC) at least >95%, hydrolyzable chlorine at most 160 mg/kg, NCO content ca. 37.5%) at 100° C.

The remaining part of the mixture is poured onto a polyethylene film and this is covered with another polyethylene film. After 168 h, the upper polyethylene film is removed and the state of the mixture is visually assessed. In the case of completely or partially cured samples (i.e. if a mechanically resilient film has formed), this is analyzed by IR spectrometry. For this purpose, an IR spectrometer from Perkin-Elmer (Perkin Elmer Spectrum Two) with an ATR unit (UATR two) is used. Cured samples were measured with the optimum contact pressure (adjustable via the device). Liquids are measured directly on the ATR unit.

Comparative measurements of the liquid mixtures before storage are used to investigate whether the NCO groups have reduced and whether additional uretdione, isocyanurate and iminooxadiazinedione groups have formed. Those skilled in the art can find the position of characteristic bands in the literature or, if this is not possible, determine them by measuring comparative spectra of model substances which are accessible by methods known in the literature.

Starting Compounds

Filler Omyacarb 5 GU, calcium carbonate, Omya, Deutschland

Plasticizer Jayflex DINP, diisononyl phtalate, Exxon Mobile 1,2-Ethanediol, Aldrich All polyisocyanates used are either commercially available from Covestro Deutschland AG or can be prepared by methods described in the patent literature based on readily available monomers and catalysts.

Polyether A According to the Invention, Used as a Structural Component for Preparing Isocyanate Prepolymers According to the Invention Polyether P1 was used, a bifunctional polypropylene glycol polyether started with propylene glycol, having a hydroxyl number of 500 mg KOH/g, viscosity 55 mPas, water content 0.01%, prepared using potassium hydroxide as catalyst, then worked up with sulfuric acid, distilled and filtered.

Polyether B According to the Invention, Used as Component C.

Desmophen® 2061 BD, linear polypropylene ether polyol having a hydroxyl number of 56 mg KOH/g, available from Covestro Deutschland AG.

Starting Isocyanate A, Desmodur® N3300

HDI polyisocyanate comprising isocyanurate groups, available from Covestro Deutschland AG.
  NCO content: 21.8%
  NCO functionality: 3.4
  Monomeric HDI: 0.1%
  Viscosity (23° C.): 3000 mPas Starting Isocyanate B Desmodur® E XP 2599, available from Covestro Deutschland AG, polyether allophanate based on 1,6-hexamethylene diisocyanate
  NCO content: 6.0%
  NCO functionality: 4
  Monomeric HDI: 0.1%
  Viscosity (23° C.): 2500 mPas Starting Isocyanate C Polyether-Allophanate Prepolymer Based on 1,6-Hexamethylene Diisocyanate This was produced analogously to Example 1a from EP 1775313, except that in this case 221.2 g of polyether P1 were used. Before adding zinc(II) bis(2-ethylhexanoate), an NCO content of 42.9% by weight was achieved and, prior to removal of excess 1,6-hexane diisocyanate, an NCO content of 39.9% was achieved.
  NCO content: 17.0%
  NCO functionality: 4
  Monomeric HDI: 0.1%
  Viscosity (23° C.): 2550 mPas Starting Isocyanate D Polyether Urethane Prepolymer Based on 1,6-Hexamethylene Diisocyanate This was produced analogously to Example 1a from EP 1775313, except that in this case 221.2 g of polyether P1 and 900 g of 1,6-hexane diisocyanate were used and neither isophthaloyl dichloride nor zinc(II) bis(2-ethylhexanoate) were added. The excess 1,6-hexamethylene diisocyanate was removed immediately after an NCO content of 31.4% was reached.
  NCO content: 12.5%
  NCO functionality: 2
  Monomeric HDI: 0.1%
  Viscosity (23° C.): 4200 mPas Starting isocyanate E Desmodur® E23

Aromatic polyisocyanate prepolymer based on diphenylmethane diisocyanate (MDI) comprising polyether groups, available from Covestro Deutschland AG
  NCO content: 15.4%
  NCO functionality: 2.1
  Viscosity (23° C.): 1800 mPas Starting Isocyanate F Desmodur® E 15

Aromatic polyisocyanate prepolymer based on tolylene diisocyanate comprising polyether groups available from Covestro Deutschland AG
  NCO content: 4.4%
  NCO functionality: 2
  Monomeric TDI: 0.2%
  Viscosity (23° C.): 7000 mPas Starting Isocyanate G Desmodur® L75 (75% in ethyl acetate), 13.3% NCO Aromatic polyisocyanate based on tolylene diisocyanate, ca. 75% by weight in ethyl acetate available from Covestro Deutschland AG
  NCO content: 13.3%
  NCO functionality: 2.7
  Monomeric TDI: 0.2%
  Viscosity (23° C.): 1600 mPas Starting Isocyanate H 922 g of starting isocyanate A were initially charged in a flange vessel under dry nitrogen and heated to 60° C. 78 g of polyether 1 were then added over one hour with stirring. The reaction mixture was then heated to 60° C. and stirred until an NCO content of 17.0% was reached.
  NCO content: 17.0%
  Viscosity (23° C.): 1600 mPas Catalyst K1—Tetrabutylphosphonium Fluoride*nHF, (70% by weight dissolved in isopropanol, prepared according to Example 1a from EP 0 962 454 B1, fluoride content (ion-selective electrode) 2.5%)
  Active component 70% by weight Catalyst K2—Potassium Acetate (60% by Weight in Diethylene Glycol)

Potassium acetate and diethylene glycol are available from Aldrich.
  Active component 60% by weight Catalyst K3—Potassium Neodecanoate, 60% by Weight 31.7 g of potassium neodecanoate, 60% by weight in dipropylene glycol methyl ether (available under the name Baerostab K 10 from Baerlocher Italia) are mixed with 44.4 g of methoxypropyl acetate, 23.9 g of 18-crown-6 crown ether.
  Active component 19.0% by weight Catalyst K4—Dibutyltin Dilaurate, 95%, Available from Aldrich
  Active component 95%

Catalyst K5—2,2'-Dimorpholinodieethyl Ether (DMDEE), 97%, Available from Aldrich
  Active component 97%

Comparative tests are marked with an * in the following.

Examples of the Selection of Suitable Catalysts

Catalyst selection for systems with predominantly aromatically, aralipatically bonded isocyanate groups In accordance with the instructions given above, tests for selecting a catalyst were carried out with starting polyisocyanate E and various catalysts. The material obtained was investigated by infrared spectroscopy (ATR-IR spectroscopy) as described above. The IR spectra were printed out as measured on DIN A4 paper. A horizontal line (0 line) at the level of 100% transmission is drawn with a pencil, parallel to the x-axis (wave numbers). For characteristic bands, for the wave number at which the transmission is minimal, a perpendicular line (signal line) is drawn up to the x-axis (wave numbers). The distance of the intersection of this line with the curve of the transmission values and the 0-line is then determined by measuring with a ruler and given in mm.

Low transmission values result in larger distance values in mm and higher distance values in mm indicate a higher proportion of these groups in the sample investigated. Alternatively, those skilled in the art can also carry out an analogous evaluation directly by comparing the transmission values of characteristic bands.

Those skilled in the art can find the position of characteristic bands in the literature or—if this is not possible—determine them by measuring comparative spectra of model substances which are accessible by methods known in the literature.

| | IR data [mm] peak height after 168 h | | |
|---|---|---|---|
| Condition after 24 h and proportion that has flowed out | NCO aromatic (2263-2275 cm$^{-1}$) | Dimer aromatic (1755-1780 cm$^{-1}$) | Trimer aromatic (1690-1720 cm$^{-1}$) |
| — Liquid | 88 | — | — |
| K1 solid, <10% | 6 | 6 | 23 |
| K2 solid, <10% | 1 | — | 40 |
| K3 liquid <10% | 20 | — | 66 |
| K4* liquid >10% | n.d. | n.d. | n.d. |

The catalysts K1, K2 and K3 are sufficiently active in the model system for systems with predominantly aromatically bonded isocyanate groups, since curing can be observed (solid after 168 hours, no liquid runs out). It can also be shown that, compared to the product without addition of a catalyst, the content of NCO groups decreases and the content of dimers (uretdione groups) and trimers (isocyanurate groups) increases, which can be read from the decreased ratio of the signal intensity between NCO and trimer. Apparently, K1, K2, and K3 acted as trimerization catalysts.

Catalyst Selection for Systems with Aliphatically Bonded Isocyanate Groups

In accordance with the instructions given above, tests for selecting a catalyst were carried out with starting polyisocyanate A and various catalysts. The material obtained was investigated by infrared spectroscopy (ATR-IR spectroscopy).

| Catalyst | Condition after 168 h or start$^S$ | IR data [mm] peak height after 168 h | |
|---|---|---|---|
| | | NCO aliphatic (2256 cm$^{-1}$) | Trimer aliphatic (1569 cm$^{-1}$) |
| Without | liquid$^S$ | 70$^S$ | 86$^S$ |
| K1 | solid, <10% | 0 | 23 |
| K2 | solid, <10% | 49 | 75 |
| K4* | liquid >10% | n.d. | n.d. |
| K5* | liquid >10% | n.d. | n.d. |

Percentages above refer to the fraction by weight of material leaked out.

The model compound without catalyst can be stored for weeks without any measurable change in the NCO content and the viscosity, and so only the starting value was given. The catalyst K1 is particularly active in the model system for systems with predominantly aliphatically bonded isocyanate groups, since curing can be observed (solid after 168 h, no liquid runs out). The catalyst K2 is also sufficiently active and results in curing. It can also be shown that, compared to the storage-stable model compound without addition of a catalyst, the content of NCO groups decreases and the content of trimers (isocyanurate groups) increases, which can be read from the decreased ratio of the signal intensity between NCO and trimer. Obviously, K1 and K2 acted as trimerization catalysts, the decrease in NCO groups proceeding significantly faster when using K1 than with K2.

Examples 1-3

| | 1* | 2 | 3 |
|---|---|---|---|
| | | Weight of component [g] | |
| Starting polyisocyanate G | 75 | 75 | 75 |
| Starting polyisocyanate F | 25 | 25 | 25 |
| Catalyst K2 | 0 | 2 | 0 |
| Catalyst K1 | 0 | 0 | 0.8 |
| Calculated NCO content of the mixture [%] | 11 | 11 | 11 |
| KTL tensile shear strength [N/mm$^2$] 24 h | 0 | 17 | 16 |

Experiment 1* shows that a mixture of the starting polyisocyanates G and F having highly reactive aromatically attached isocyanate groups (NCO content 11%), without addition of a catalyst and without ingress of sufficient amounts of moisture, does not lead to any tensile shear strength of the bonded substrates even after 24 hours, since there is obviously insufficient curing. In contrast, in tests 2 and 3, an addition of catalysts K2 and K1 according to the invention without ingress of moisture and in the absence of other compounds having isocyanate-reactive groups leads to high tensile shear strength in the event of substrate failure (detachment of the KTL coating from the sheet metal).

Examples 4-11

| | 4 | 5* | 6 | 7 | 8 | 9 | 10 | 11 |
|---|---|---|---|---|---|---|---|---|
| | | | | Weight of component [g] | | | | |
| Starting polyisocyanate C | 100 | 100 | | | | | | |
| Starting polyisocyanate A | | | 97 | 81 | 50 | 75 | 100 | |
| Starting polyisocyanate B | | | | | | 25 | | |
| Starting polyisocyanate D | | | | | 50 | | | |
| Starting polyisocyanate H | | | | | | | | 100 |
| Catalyst K1 | 0.8 | | 0.8 | 0.8 | 0.8 | 0.8 | 0.8 | 0.8 |
| Catalyst K4 | | 0.2 | | | | | | |
| 1,2-ethanediol | | 1.1 | 3 | | | | | |
| Polyether B | | | | 19 | | | | |

-continued

|  | 4 | 5* | 6 | 7 | 8 | 9 | 10 | 11 |
|---|---|---|---|---|---|---|---|---|
|  | | | | Weight of component [g] | | | | |
| Calculated NCO content of the mixture [%] | 17 | 17 | 21 | 17 | 17 | 17 | 22 | 17 |
| Pot life [min] | 240 | 30 | 360 | n.d. | n.d. | 200 | 60 | 30 |
| Eloxal tensile shear strength [N/mm²] 24 h | 5 | | | | | | | |
| Tensile shear strength 24 h Beechwood [N/mm²] | 11 | | | | | | | |
| Tensile shear strength 24 h PVC [N/mm²] | 9 | | | | | | | |
| Tensile shear strength 24 h Polystyrene [N/mm²] | 2 | | | | | | | |
| KTL tensile shear strength 3 h [N/mm²] | 5 | | | | | | | |
| KTL tensile shear strength 14 h [N/mm²] | 16 | | | | | | | |
| KTL tensile shear strength 24 h [N/mm²] | 17 | 11 | 16 | 12[1)] | 11 | 11 | 17 | 17 |

[1)] substrate failure
n.d. = not determined

It can be seen that the two-component polyurethane system with DBTL as the urethanization catalyst (comparative test 5*) has a less favorable ratio of attained strength and pot life compared to the systems according to the invention based on aliphatic and aromatic polyisocyanates. Comparative test 5* has a lower strength than test 4 according to the invention with a shorter pot life. High tensile strengths are achieved on many typical substrates. The bonds on KTL show that after just a few hours such high strengths are achieved that the substrates can be handled safely. This enables short pressing times to be achieved.

Example 12-16

|  | 12* | 13 | 14 | 15 | 16 |
|---|---|---|---|---|---|
|  | | Weight of component [g] | | | |
| Starting polyisocyanate A | | 72 | 45 | 17 | 0 |
| Starting polyisocyanate B | 0 | 28 | 55 | 83 | 100 |
| Starting polyisocyanate F | 100 | | | | |
| Catalyst K3 | 3 | 3 | 3 | 3 | 3 |
| Calculated NCO content of the mixture [%] | 4 | 18 | 13 | 9 | 6 |
| KTL Tensile shear strength 24 h [N/mm²] | 0 | 16 | 10 | 3 | 1 |

In test 12*, a non-inventive starting polyisocyanate having an NCO content of ca. 4% is used in combination with the catalyst K3. This adhesive composition does not result in sufficient tensile shear strength, since after 24 hours there is clearly insufficient curing. Examples 13 to 16 according to the invention show that lower tensile shear strengths are determined as the NCO content decreases.

Examples 17-22

|  | 17 | 18 | 19 | 20 | 21 | 22 |
|---|---|---|---|---|---|---|
|  | | | Weight of component [g] | | | |
| Starting polyisocyanate A | 80 | 60 | 40 | 80 | 60 | 40 |
| Catalyst K1 | 0.8 | 0.8 | 0.8 | 0.8 | 0.8 | 0.8 |
| filler | 20 | 40 | 60 | | | |
| plasticizer | | | | 20 | 40 | 60 |
| Calculated NCO content of the mixture [%] | 17 | 13 | 9 | 17 | 13 | 9 |
| KTL Tensile shear strength 24 h [N/mm²] | 11 | 5 | 2 | 10 | 4 | 2 |

Analogously to this, further examples 17-22 with the catalyst K1 show that even with the addition of fillers and/or plasticizers, adhesive compositions can achieve high tensile shear strengths and can thus be used. However, as the NCO content of the mixture decreases, lower tensile shear strengths are also obtained here.

The invention claimed is:

1. A process for producing an adhesive joint comprising:
   a) applying a coating composition to a surface to form a coated surface, the coating composition comprising:
      a polyisocyanate composition A having an average isocyanate functionality of at least 1.5, and
      at least one catalyst B, which at 23° C. catalyzes a reaction of NCO groups to form isocyanurate groups and/or uretdione groups,
      wherein an isocyanate content of the coating composition is 5% by weight to 60% by weight and a molar ratio of isocyanate groups to isocyanate-reactive groups optionally present in the coating composition is at least 5:1;
   b) contacting the coated surface with a further surface; and
   c) curing the coating composition at a temperature of at least 10° C. and at most 60° C.,
   wherein in process step c) initially a temperature between 10° C. and 40° C. is maintained until the adhesive joint reaches a tensile shear strength according to DIN EN 1465 for adhesives of at least 0.5 N/mm² and then a temperature of at least 50° C. is maintained until the adhesive joint reaches a strength of at least 2 N/mm².

2. The process as claimed in claim 1, additionally comprising providing the coating composition by mixing the polyisocyanate composition A and the at least one catalyst B prior to applying the coating composition, wherein a period of time of at least 30 minutes elapses between providing the coating composition and the end of process step b).

3. The process as claimed in claim 1, wherein in process step b) at least 20% of the isocyanate groups present in the coating composition at the start of process step b) are converted to isocyanurate groups and at most 30% of the isocyanate groups present in the coating composition at the start of process step b) are converted to urea groups.

4. The process as claimed in claim 1, wherein the coating composition additionally comprises at least one compound C comprising on average at least 1.0 group reactive with isocyanate groups per molecule.

5. The process as claimed in claim 4, wherein the compound C is selected from the group consisting of ethanol, 1-propanol, 1-butanol, ethanediol, glycol, 1,2,10-decanetriol, 1,2,8-octanetriol, 1,2,3-trihydroxybenzene, glycerol, 1,1,1-trimethylolpropane, 1,1,1-trimethylolethane, pentaerythritol, sugar alcohols, polyethylene glycol (PEG) 200, PEG 300, PEG 400, PEG 600, diethanolamine, triethanolamine, and combinations thereof.

6. The process as claimed in claim 1, wherein the polyisocyanate composition A comprises isocyanate-terminated prepolymers.

7. The process as claimed in claim 1, wherein the coating composition comprises at least 5% by weight isocyanate groups, based on an organic phase of the coating composition.

8. The process as claimed in claim 1, wherein the coating composition comprises less than 0.1% by weight transition metals, based on a total weight of the coating composition.

9. The process as claimed in claim 1, wherein the coating composition additionally comprises at least one filler D.

10. The process as claimed in claim 1, wherein the polyisocyanate composition A comprises at least 80% by weight polyisocyanates having aliphatically bonded isocyanate groups.

11. The process as claimed in claim 1, wherein the surface is selected from the group consisting of glass, ceramic, glass ceramic, concrete, mortar, brick, tiles, gypsum, natural stone, metal, metal coated with cathode electrodeposition material, plastic, leather, paper, wood, resin-bonded wood-based materials, textiles, resin-textile composites, polymer composites, and combinations thereof.

12. The process as claimed in claim 1, wherein the adhesive joint has a thickness of at least 1 mm.

13. The process as claimed in claim 1, wherein the curing is completed in no more than 24 hours.

* * * * *